(12) United States Patent
Tomita et al.

(10) Patent No.: US 7,086,789 B2
(45) Date of Patent: Aug. 8, 2006

(54) OPTICAL ELEMENT MODULE WITH A PRIMARY COATED OPTICAL FIBER

(75) Inventors: Nobuo Tomita, Tokyo (JP); Fumiaki Hanawa, Tokyo (JP); Norio Takato, Tokyo (JP); Satoru Konno, Tokyo (JP); Yuichi Kikuchi, Tokyo (JP); Jyunko Katoh, Tokyo (JP); Yoshitaka Enomoto, Tokyo (JP); Akira Miyashita, Tokyo (JP); Hisashi Izumita, Tokyo (JP)

(73) Assignee: NTT Electronics Corporation, Tokyo (JP)

( * ) Notice: Subject to any disclaimer, the term of this patent is extended or adjusted under 35 U.S.C. 154(b) by 145 days.

(21) Appl. No.: 10/648,175

(22) Filed: Aug. 26, 2003

(65) Prior Publication Data

US 2004/0202434 A1    Oct. 14, 2004

(30) Foreign Application Priority Data

Apr. 10, 2003  (JP)  ............................ 2003-106731

(51) Int. Cl.
*G02B 6/36*    (2006.01)
(52) U.S. Cl. .............................. 385/94; 385/92; 385/31
(58) Field of Classification Search ............ 385/88–94, 385/31–38
See application file for complete search history.

(56) References Cited

U.S. PATENT DOCUMENTS

| 4,756,595 A | * | 7/1988 | Braun et al. | .................. 385/75 |
| 6,371,664 B1 | * | 4/2002 | Takahashi et al. | ............ 385/88 |

FOREIGN PATENT DOCUMENTS

| JP | 05-066318 | 3/1993 |
| JP | 07-013039 | 1/1995 |

OTHER PUBLICATIONS

Yui Masaru, et al; Optical Waveguide Module, Patent Abstracts of Japan, Publication No. JHP07-092342A; Filed: Jul. 6, 1994.
Kurosawa Yoshinori, et al; Waveguide Type Optical Device, Patent Abstracts of Japan, Publication No. JHP08-171029A; Filed: Dec. 20, 2004.

* cited by examiner

*Primary Examiner*—Kevin S. Wood
(74) *Attorney, Agent, or Firm*—James V. Costigan; Hedman & Costigan

(57) ABSTRACT

An optical element module is equipped with a casing, an optical element provided inside the casing, a pipe which communicates the inside of the casing to the outside, and a primary coated optical fiber which is inserted through the pipe and connected to the optical element.

3 Claims, 13 Drawing Sheets

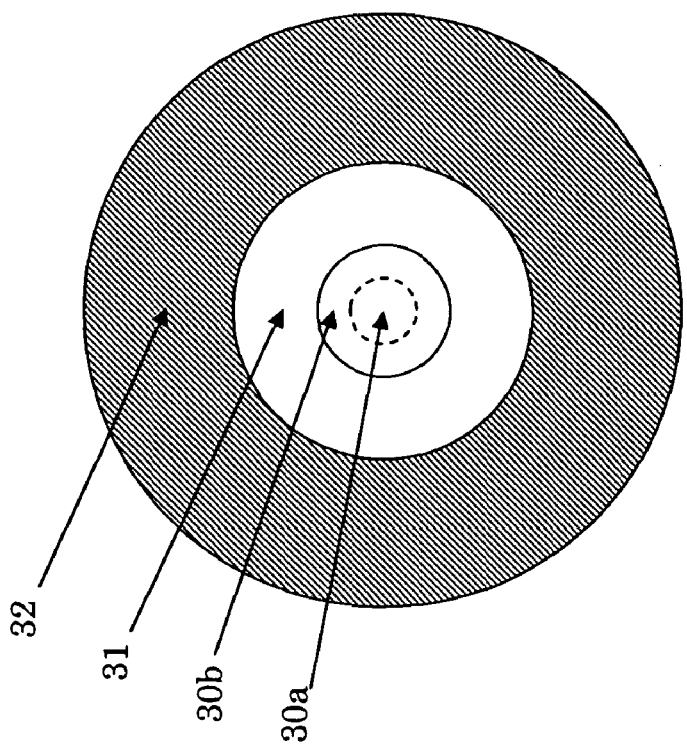
(Prior Art) Fig. 2C
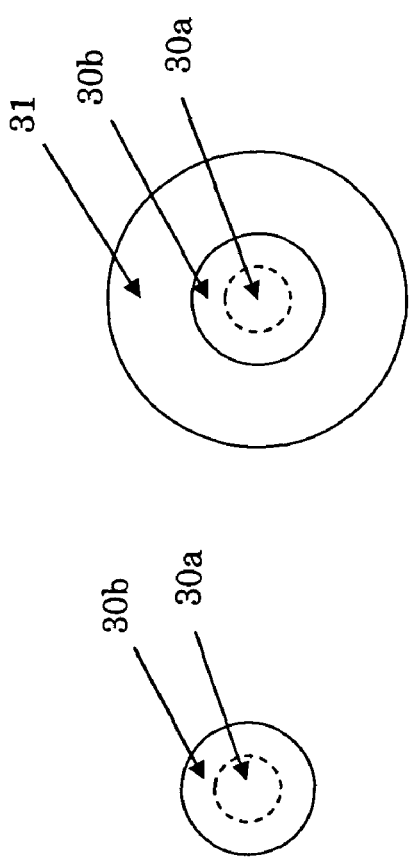
(Prior Art) Fig. 2B
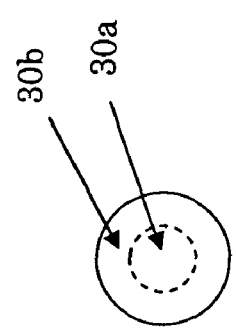
(Prior Art) Fig. 2A

OPTICAL ELEMENT MODULE WITH A PRIMARY COATED OPTICAL FIBER

BACKGROUND OF THE INVENTION

1. Field of the Invention

The present invention is related to an optical element module used in optical fiber communication. In particular, the present invention is related to an optical element module which is durable against environmental temperature fluctuations.

2. Description of the Related Art

In order to connect optical fibers to an optical element of an optical waveguide or the like, an optical element module is used in which the optical element is provided inside a casing, and the optical fibers are introduced from the outside of the casing and connected to the optical element inside the casing. The structure of a related art optical element module is shown in FIG. 1.

In FIG. 1, 50 represents an optical element module, 51 represents a casing, 52 represents an optical waveguide protecting plate which covers an optical waveguide, 53a and 53b represent optical fiber holding portions, 54 represents a coated optical fiber, 55 represents a bare optical fiber, 56 represents taped optical fibers, 57 represents bare optical fibers, and 58 and 59 represent adhesive fixing portions.

The types of optical fibers described in this application are shown in FIGS. 2A,2B,2C and FIG. 3. In FIGS. 2A,2B and 2C, 30a represents an optical fiber core portion, 30b represents an optical fiber clad portion, 31 represents a primary coating, and 32 represents a secondary coating. The optical fiber (see FIG. 2C) which is coated up to the secondary coating is called a coated optical fiber, the optical fiber (see FIG. 2B) which is coated up to the primary coating is called a primary coated optical fiber, and the optical fiber (see FIG. 2A) which does not have even the primary coating is called a bare optical fiber. Normally, the external diameters of the coated optical fiber, the primary coated optical fiber and the bare optical fiber are 900 μm, 250 μm and 125 μm, respectively. In FIG. 3, 30a represents an optical fiber core portion, 30b represents an optical fiber cladding portion, 31 represents a primary coating, and 33 represents a secondary coating for creating a taped fiber generally called as a fiber ribbon. In the taped optical fiber, the optical fiber which is coated up to the secondary coating is called a taped optical fiber, the optical fiber which is coated up to the primary coating is called a primary coated optical fiber, and the optical fiber which does not have even the primary coating is called a bare optical fiber.

The optical element module 50 shown in FIG. 1 includes one light input and four light outputs, wherein the input light from one optical fiber is divided into four branches by an optical waveguide formed by four branching optical circuits, and the branched light is optically outputted to four optical fibers. The optical fibers are connected to the input and output end surfaces of the optical waveguide, and the optical waveguide and the like are provided inside the casing. The coated optical fiber 54 for light input is guided from the outside into the inside of the casing 51, and the primary coating and the secondary coating are removed to form the bare optical fiber 55. The bare optical fiber 55 is housed in the optical fiber holding portion 53a which includes a V-groove or the like, and is fixed to the optical waveguide in a state where the optical axis is aligned with the input portion of the optical waveguide (not shown in the drawings). The taped optical fibers 56 for light output are guided from the outside into the inside of the casing 51, and the primary coating and the secondary coating are removed to form the bare optical fibers 57. The bare optical fibers 57 are housed in the optical fiber holding portion 53b which includes V-grooves or the like, and are fixed to the optical waveguide in a state where the optical axes are aligned with the output portion of the optical waveguide (not shown in the drawings).

The optical waveguide protecting plate 52 is fixed to the top of the optical waveguide, and by increasing the contact surface area of the optical fiber holding portions 53a and 53b, a stable connection between the bare optical fibers 55, 57 and the optical waveguide is maintained. The optical waveguide is fixed to a bottom portion of the casing 51 by an adhesive. The coated optical fiber 54 for light input is fixed to the casing 51 by the adhesive fixing portion 58, and the taped optical fibers 56 for light output are fixed to the casing 51 by the adhesive fixing portion 59.

In accordance with the structure of an optical access line network suited to the PON (Passive Optical Network) topology of recent years, there is a demand to provide an optical element module internally equipped with a waveguide in an outdoor facility, and this creates the need to make the optical element module adapted to outdoor use. In particular, because optical fibers are housed in a narrow outdoor facility, primary coated optical fibers need to be used as optical fibers for light input and light output.

In the related art optical element module, in the case where the optical fibers for light input and light output are made primary coated optical fibers, it was determined that stable characteristics can not be obtained in an environment where there are severe temperature changes. A temperature cycle test was carried out for the case where the optical fiber for light input in the related art optical element module was made a primary coated optical fiber. The test results are shown in FIG. 4. In FIG. 4, the horizontal axis represents the test time, and the vertical axis of the graphs in the upper portion of FIG. 4 represents the increased optical loss of the optical element module at each temperature. Eight hours formed one cycle, and from the results obtained by carrying out a temperature cycle test from −40° C. to +75° C., it was understood that there are large fluctuations of the optical loss of the optical element module when the environmental temperature of the optical element module changes.

As for the cause of the large fluctuations of the optical loss shown in FIG. 4, in the case where the environmental temperature changes, in particular, in the case where the environmental temperature reaches a low temperature, because the primary coated optical fibers and the casing of the optical element module contract, a tensile and compressive stress is generated between the two points of the optical fiber holding portion which adhesively fixes the primary coated optical fiber for light input and the adhesive fixing portion which fixes such optical fiber to the casing by an adhesive, and as a result, micro bends are created in the primary coated optical fiber for light input, and this was understood to cause an increase in the optical loss.

Further, when coated optical fibers like that shown in FIG. 2C are made the optical fibers for light input and light output, slippage occurs between the primary coating and the secondary coating fixed by an adhesive, and because the stress on the primary coating is reduced, the optical loss does not increase even when the environmental temperature reaches a low temperature. This is the same for the taped optical fiber of FIG. 3. Even when the outside of the secondary coating of the taped optical fiber is fixed by an adhesive, slippage occurs between the primary coating and the secondary coating, and because the stress on the primary coating is reduced, the optical loss does not increase even when the environmental temperature reaches a low temperature.

SUMMARY OF THE INVENTION

In order to solve the problems of the related art described above, it is an object of the present invention to provide an optical element module which has small optical loss fluctuations for a wide range of temperature fluctuations even in the case where primary coated optical fibers are used as optical fibers for light input and light output.

In order to achieve the object stated above, the first invention of the present application is an optical element module equipped with a casing, an optical element provided inside the casing, a pipe which communicates the inside of the casing to the outside, and a primary coated optical fiber which is inserted through the pipe and connected to the optical element.

By making a loose contact between the primary coated optical fiber and the pipe, the first invention of the present application makes it possible to provide an optical element module which has stable temperature characteristics even when the environmental temperature fluctuates.

The second invention of the present application is an optical element module obtained by filling a gel material into the internal cavity of the optical element module of the first invention of the present application.

The second invention of the present application improves the bearing force against mechanical stresses such as vibration, shocks and the like applied to the optical element module.

The third invention of the present application is an optical element module obtained by making the difference between the volume of the internal cavity of the optical element module and the volume of the gel material that occurs accompanying environmental temperature fluctuations smaller than the volume of the space between the pipe and the primary coated optical fiber in the second invention of the present application.

The third invention of the present application prevents the gel material from leaking out even when the environmental temperature fluctuates.

BRIEF DESCRIPTION OF THE DRAWINGS

FIG. 2A is a cross-sectional view of a bare optical fiber described in the present application, FIG. 2B is a cross-sectional view of a primary coated optical fiber described in the present application, and FIG. 2C is a cross-sectional view of a secondary coated optical fiber described in the present application.

DETAILED DESCRIPTION OF THE PREFERRED EMBODIMENTS

The preferred embodiments of the present invention will now be described in detail with reference to the appended drawings.

In the description of the preferred embodiments, 23a and 23b represent rubber boots, specifically 23a represents a first rubber boot to which a pipe 24 is fixed and 23b represents a second rubber boot to which a taped optical fiber 22 is fixed.

Embodiment 1

Figure 1:
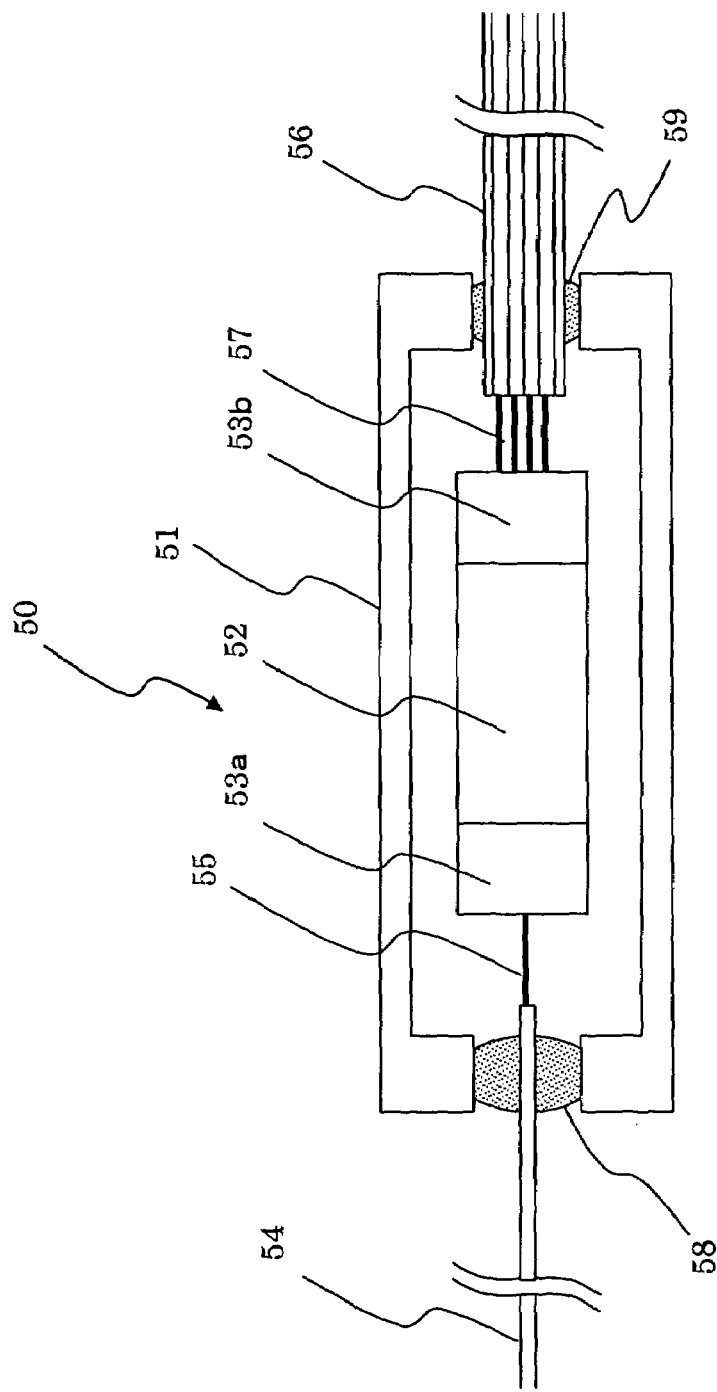
FIG. 1 is a cross-sectional view of the structure of a related art optical element module.
Figure 3:
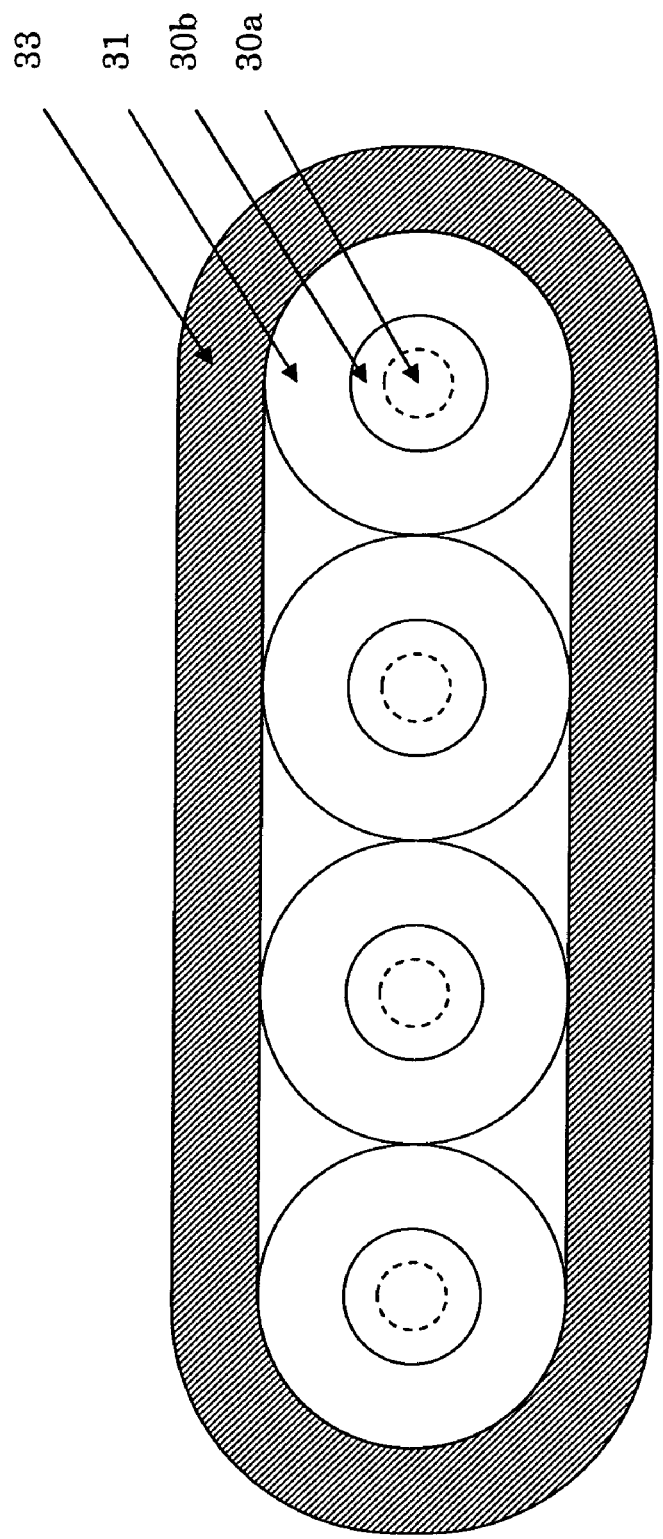
FIG. 3 is a cross-sectional view of the taped type of optical fibers described in the present application.
Figure 4:
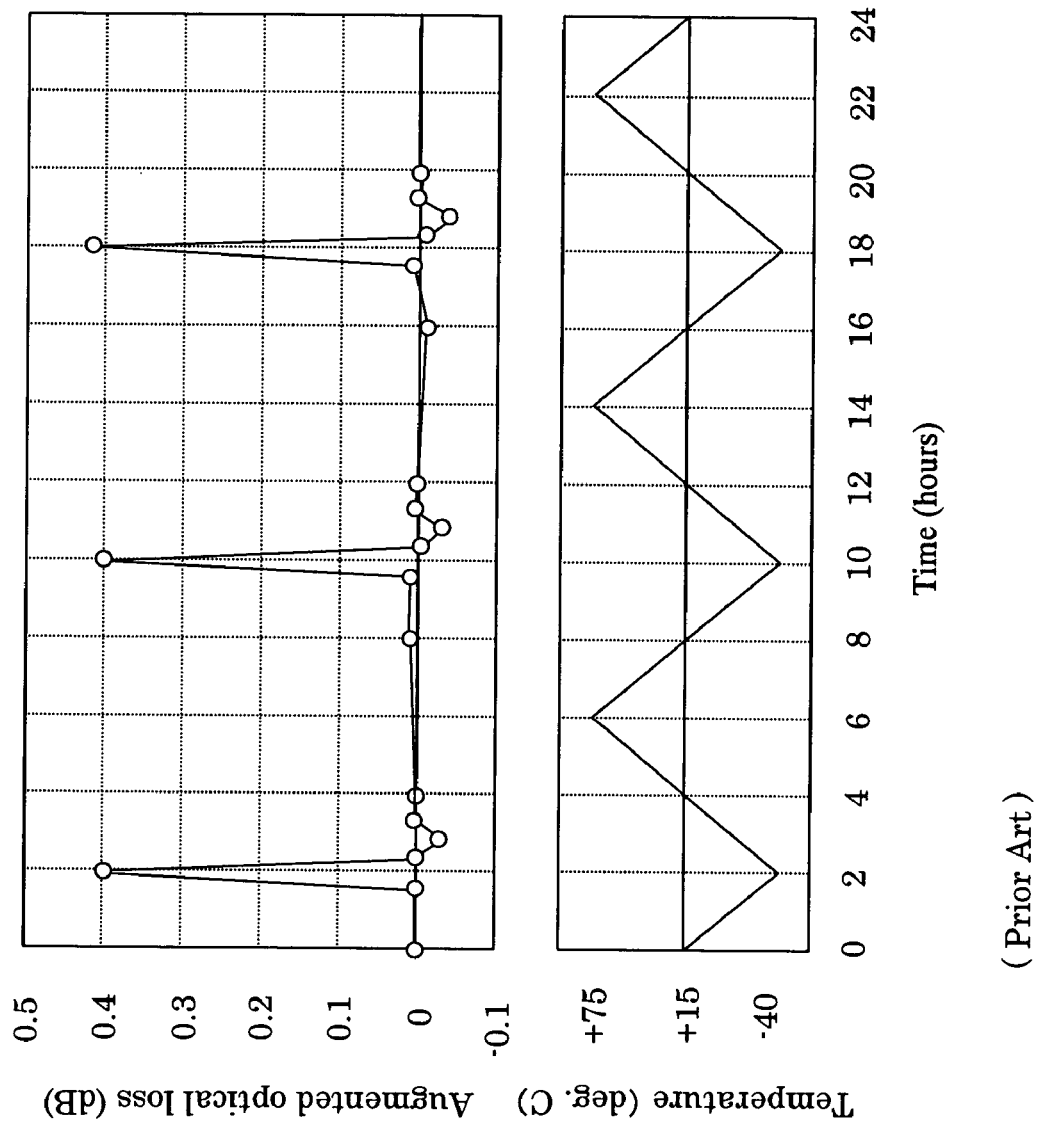
FIG. 4 is a graph showing the results of a temperature cycle test for the case where a primary coated optical fiber is used as the optical fiber for light input in the related art optical element module.
Figure 5:
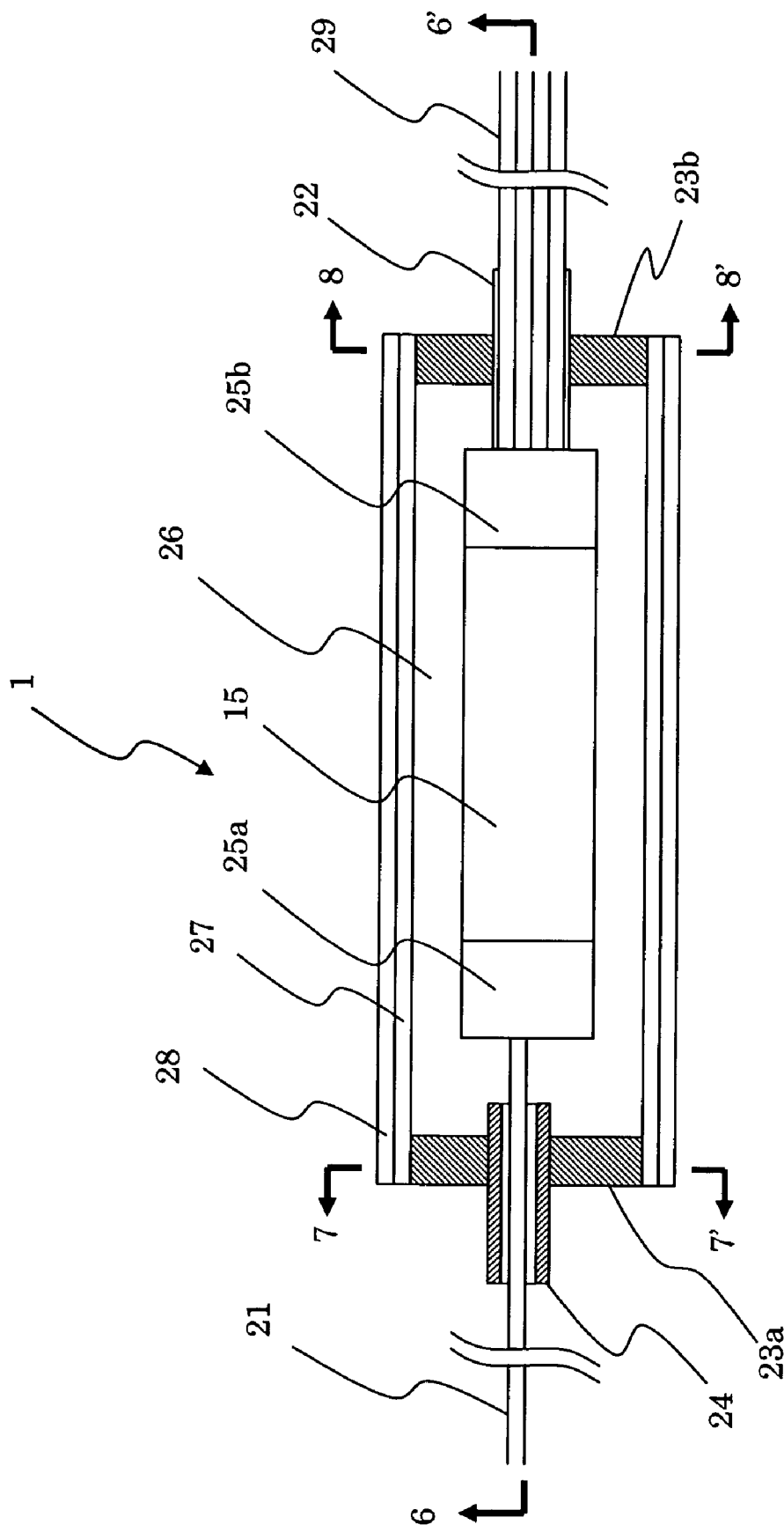
FIG. 5 is a cross-sectional view of the first embodiment of an optical element module of the present invention from the front view.
Figure 6:
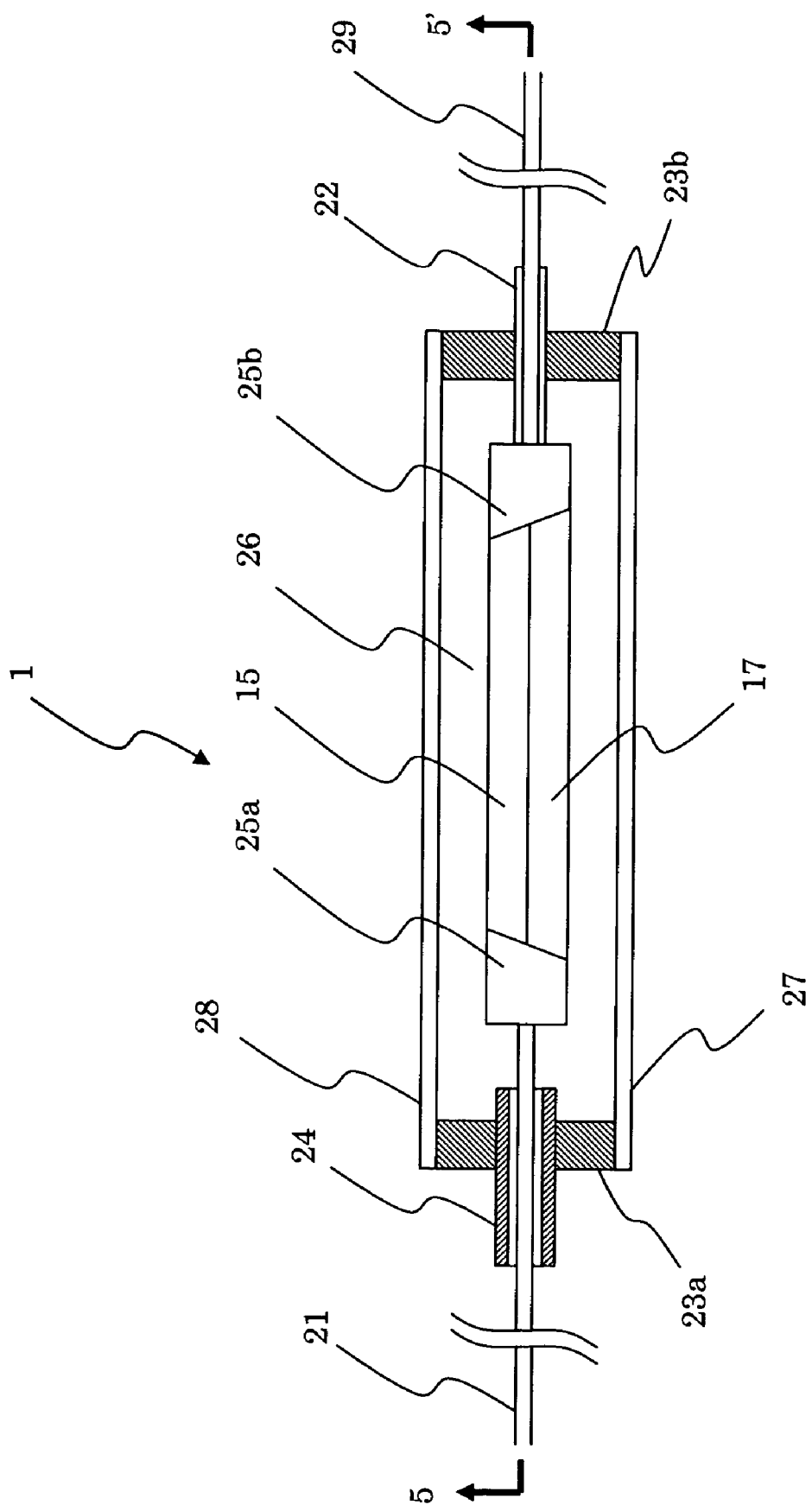
FIG. 6 is a cross-sectional view of the first embodiment of an optical element module of the present invention from the side view.
Figure 7:
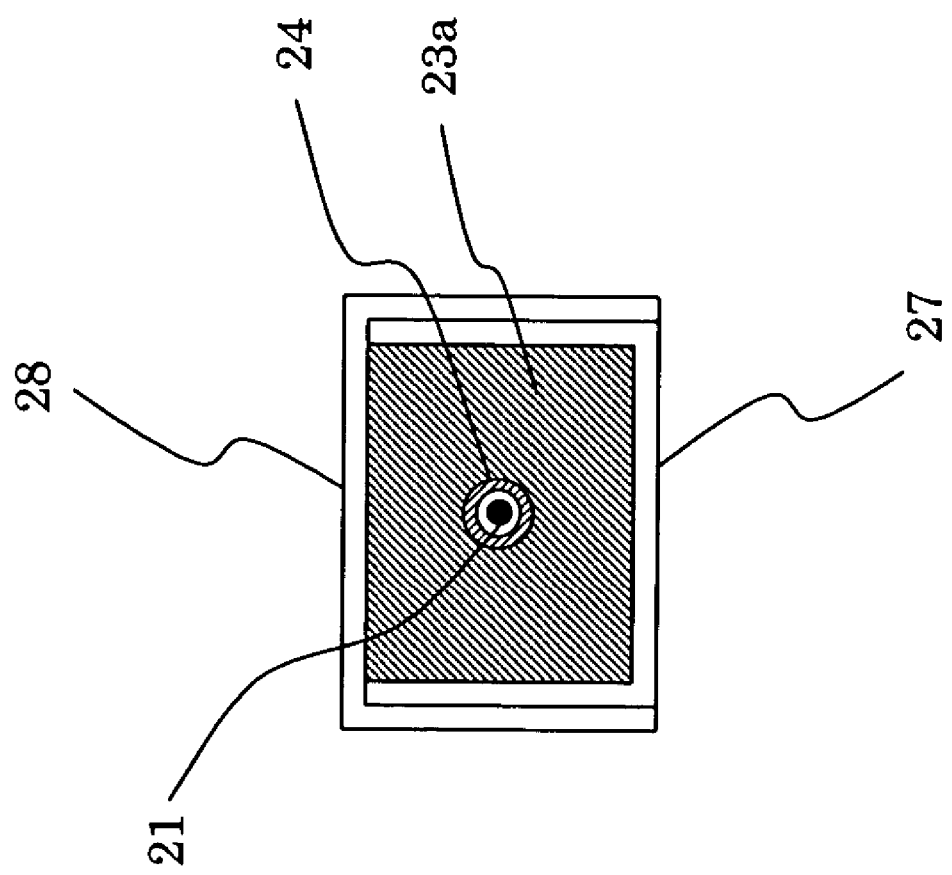
FIG. 7 is a cross-sectional view of the light input portion of the first embodiment of an optical element module of the present invention.
Figure 8:
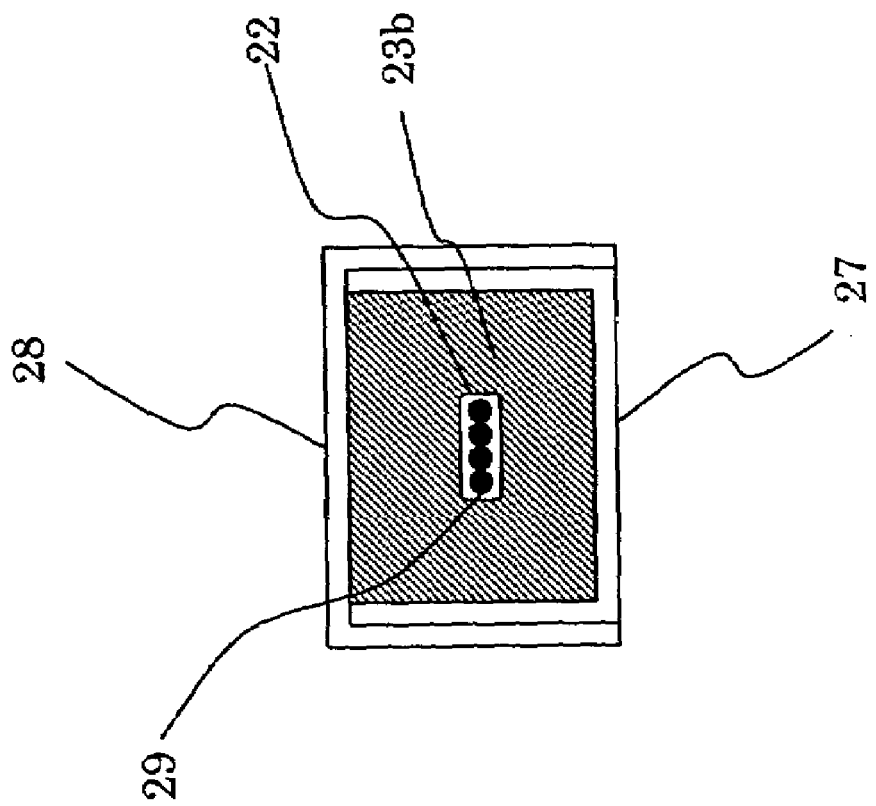
FIG. 8 is a cross-sectional view of the light output portion of the first embodiment of an optical element module of the present invention.

A first embodiment of the present invention is shown in FIG. 5, FIG. 6, FIG. 7 and FIG. 8. FIG. 5 is a plan cross-sectional view of an optical element module, FIG. 6 is a cross-sectional view taken along the lines 6–6' in FIG. 5, FIG. 7 is a cross-sectional view taken along the lines 7–7' in FIG. 5, and FIG. 8 is a cross-sectional view taken along the lines 8–8' in FIG. 5. Further, FIG. 5 is a cross-sectional view taken along the lines 5–5' in FIG. 6. In FIGS. 5~8, 1 represents an optical element module, 15 represents an optical waveguide protecting plate, 17 represents an optical waveguide chip as an optical element, 21 represents a primary coated optical fiber, 22 represents taped optical fibers, 23a and 23b represent rubber boots, 24 represents a pipe, 25a and 25b represent optical fiber holding portions, 26 represents an internal cavity of the optical element module, 27 represents a lower portion casing, 28 represents an upper portion casing, and 29 represents primary coated optical fibers.

The optical waveguide chip 17 has a 1×4 optical splitter circuit for dividing the light input into four branches formed on a waveguide chip substrate. In the optical waveguide chip 17, the optical waveguide protecting plate 15 which covers the top of the optical waveguide chip is adhesively fixed to protect the optical waveguide, and at the same time, the optical waveguide chip 17 becomes integrated with the optical waveguide protecting plate 15 to form input and output end surfaces (not shown in the drawings). The optical fiber holding portions 25a and 25b which respectively hold the primary coated optical fiber 21 for light input and the taped optical fibers 22 are adhesively fixed in a state where they contact against such input and output end surfaces. The lower portion casing 27 and the upper portion casing 28 which has a C-shaped cross section are fitted into each other to form the casing of the optical element module.

The optical fiber for light input is a single fiber, and when assuming use inside an outdoor facility, a primary coated optical fiber having an outside diameter of 0.25 mm is used. By using a primary coated optical fiber, it becomes easy to carry out fusion to connect the primary coated optical fiber arranged inside the outdoor facility. One end of the primary coated optical fiber 21 is held in the optical fiber holding portion 25a in a state where the primary coating has been removed to form a bare optical fiber. As an example of the holding method, the optical fiber is pushed against a V-groove and adhesively fixed. The end surface of the optical fiber holding portion 25a contacting against the optical waveguide chip 17 is made an inclined surface which is inclined at a prescribed angle with respect to the optical axis of the optical fiber, and this inclined surface and the inclined end surface of the optical waveguide chip 17 set at the same angle are connected to each other. The other end of the primary coated optical fiber 21 is inserted through the pipe 24 which communicates the inside of the casing to the outside, and guided to the outside.

The pipe 24 is designed so that the optical axis from the primary coated optical fiber 21 is aligned with the optical waveguide of the optical waveguide chip 17 in the state where the primary coated optical fiber 21 is inserted through the pipe 24, and is fixed to the rubber boot 23a which is adhesively fixed to the ends of the lower portion casing 27 and the upper portion casing 28. The pipe 24 is preferably made from an elastic material which is not deformed by temperature changes such as a nylon tube. The internal diameter of the pipe 24 is made larger than the outside diameter of the primary coated optical fiber 21. For example, when the outside diameter of the primary coated optical fiber is 250 μm, a pipe having an internal diameter of 1 mm and a circular cross section is preferred. In view of the fact that the primary coated optical fiber inserted through the pipe 24 is bent by handling and the like, the length of the pipe 24 is made longer than the length of the through hole of the rubber boot 23a. For example, the pipe 24 preferably protrudes about 1 mm into the inside of the optical element module from the rubber boot 23a, and protrudes about 5 mm to the outside of the optical element module.

The optical fibers for light output are four taped optical fibers. One end of the taped optical fibers 22 is held in the optical fiber holding portion 25b in a state where the primary coatings have been removed to form bare optical fibers. As an example of the holding method, the optical fibers are pushed against four V-grooves which correspond to the optical fiber spaces of the four taped optical fibers, and adhesively fixed. The end surface of the optical fiber holding portion 25b contacting against the optical waveguide chip 17 is made an inclined surface which is inclined at a prescribed angle with respect to the optical axis of the optical fibers, and this inclined surface and the inclined end surface of the optical waveguide chip 17 set at the same angle are connected to each other. The other end of the taped optical fibers 22 is inserted through the through hole of the rubber boot 23b and guided to the outside. Further, at the tip thereof, the taped outer coatings of the taped optical fibers are removed to form primary coated optical fibers which can be connected by fusion to other primary coated optical fibers inside an outdoor facility. The taped optical fibers 22 are fixed by an adhesive to the rubber boot 23b so that the taped optical fibers 22 do not move with respect to the rubber boot 23b.

In the case where a primary coated optical fiber is used for the optical fiber for light input or light output, a pipe can be used in a loose structure in which the primary coated optical fiber is not bonded to the rubber boot. By forming this kind of loose structure, because the primary coated optical fiber can move freely inside the pipe, when the environmental temperature changes, no stress is applied to the optical fiber cladding/core even when the primary coating of the primary coated optical fiber and the casing shrink and expand. As a result, there is no occurrence of micro bends accompanying environmental temperature fluctuations, and this eliminates the cause of increases of the optical loss.

Further, when taped optical fibers are used, because the stress accompanying environmental temperature fluctuations is absorbed between the primary coating and the secondary coating, the optical loss is not increased by such environmental temperature fluctuations even when the taped optical fibers 22 are adhesively fixed to the rubber boot 23b.

Next, a method of manufacturing the optical element module of the present embodiment will be described. The optical waveguide chip can be obtained by depositing a lower portion cladding layer and a core layer on top of a Si substrate or quartz substrate by flame hydrolysis deposition using a known method of manufacturing a quartz type glass waveguide, forming a core pattern of light branching circuits on the lower portion cladding layer by photolithography and reactive ion etching using a waveguide mask, and then depositing an upper portion cladding layer by flame hydrolysis deposition to bury the core portion.

In order to connect the optical fibers to the input and output ends of the optical waveguide chip, the optical waveguide protecting plate is mounted to the optical waveguide chip. Namely, an adhesive is applied to the top surface of the upper portion cladding layer of the optical waveguide chip, and then the adhesive is hardened while pressing the optical waveguide protecting plate, whereby the optical waveguide protecting plate is bonded to the optical waveguide chip. In this case, an optical waveguide protecting plate may be mounted individually on each optical waveguide chip, but it is also possible to obtain optical waveguide chips furnished with optical waveguide protecting plates by cutting out a plurality of optical waveguide chips from a wafer so that the input and output end surfaces of the optical waveguide chips are exposed and the side surfaces are linked, mounting an optical waveguide protecting plate to such collection of optical waveguide chips, polishing the input and output end surfaces, and then collectively cutting away prescribed sections to form optical waveguide chips furnished with optical waveguide protecting plates. Because the operation for mounting the optical waveguide protecting plate and the polishing operation can be carried out collectively, such operations are efficient.

The optical fibers for light input and the optical fibers for light output are connected to the obtained optical waveguide chips furnished with the optical waveguide protecting plate. Further, an optical fiber array substrate on which optical fibers are arranged is prepared so as to correspond to the plurality of optical waveguide chips, and this optical fiber array substrate is collectively connected and fixed to the linked optical waveguide chips on which the optical waveguide protecting plate is mounted, and then by cutting away each optical waveguide chip, because the operations up to the connecting of the optical fibers to the plurality of optical waveguide chips can be carried out collectively, such operations are more efficient.

Next, the primary coated optical fiber for light input connected to the optical waveguide chip is inserted through the inside of the pipe fixed to the rubber boot. Further, the taped optical fibers for light output connected to the optical waveguide chip are inserted through the through hole of the rubber boot and are adhesively fixed in advance to the rubber boot.

Finally, the two rubber boots described above are fixed by an adhesive to the inside of both ends of the C-shaped lower portion casing, and a gel material is filled into the internal cavity of the optical element module. Next, an adhesive is applied to the bonding surface of the C-shaped upper portion casing, and then the upper portion casing is placed over the C-shaped lower portion casing and bonded thereto.

Figure 9:
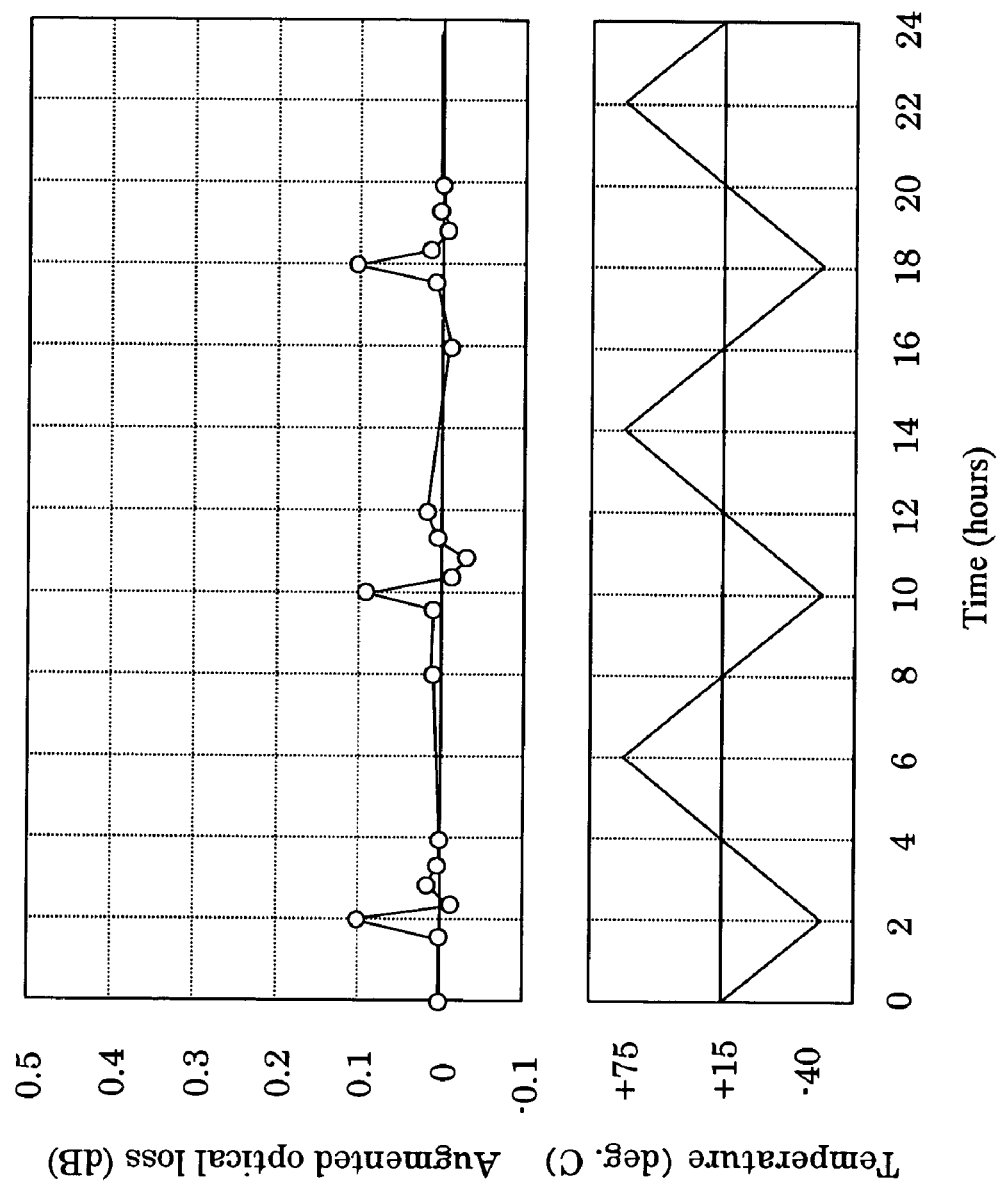
FIG. 9 is a graph showing the results of a temperature cycle test for the first embodiment of an optical element module of the present invention.

A temperature cycle test was carried out for the optical element module obtained in this way. The test results are shown in FIG. 9. In FIG. 9, the horizontal axis represents the test time, and the vertical axis of the graphs in the upper portion of FIG. 9 represents the increased optical loss of the optical element module at such time. Eight hours formed one cycle, and from the results obtained by carrying out a temperature cycle from −40° C. to +75° C., it is clear that the optical loss in the optical element module of the present embodiment does not experience the large fluctuations that occur in related art optical element modules even when the environmental temperature of the optical element module changes.

Namely, even if the primary coated optical fiber and the casing of the optical element module contract when the environmental temperature reaches a low temperature, because optical element module has a structure in which the primary coated optical fiber for light input is inserted loosely through a pipe, no tensile/compressive stress is generated in the optical fiber, and as result, the optical loss does not increase.

In the present embodiment, a primary coated optical fiber is used for the optical fiber for light input, but in the case where primary coated optical fibers are used for the optical fibers for light output, such primary coated optical fibers are preferably inserted through a pipe provided in a rubber boot. Further, an optical waveguide chip is used as an example of an optical element provided inside a casing, but the same results can be obtained for an optical semiconductor light generating element or light-receiving optical element.

Embodiment 2

Figure 10:
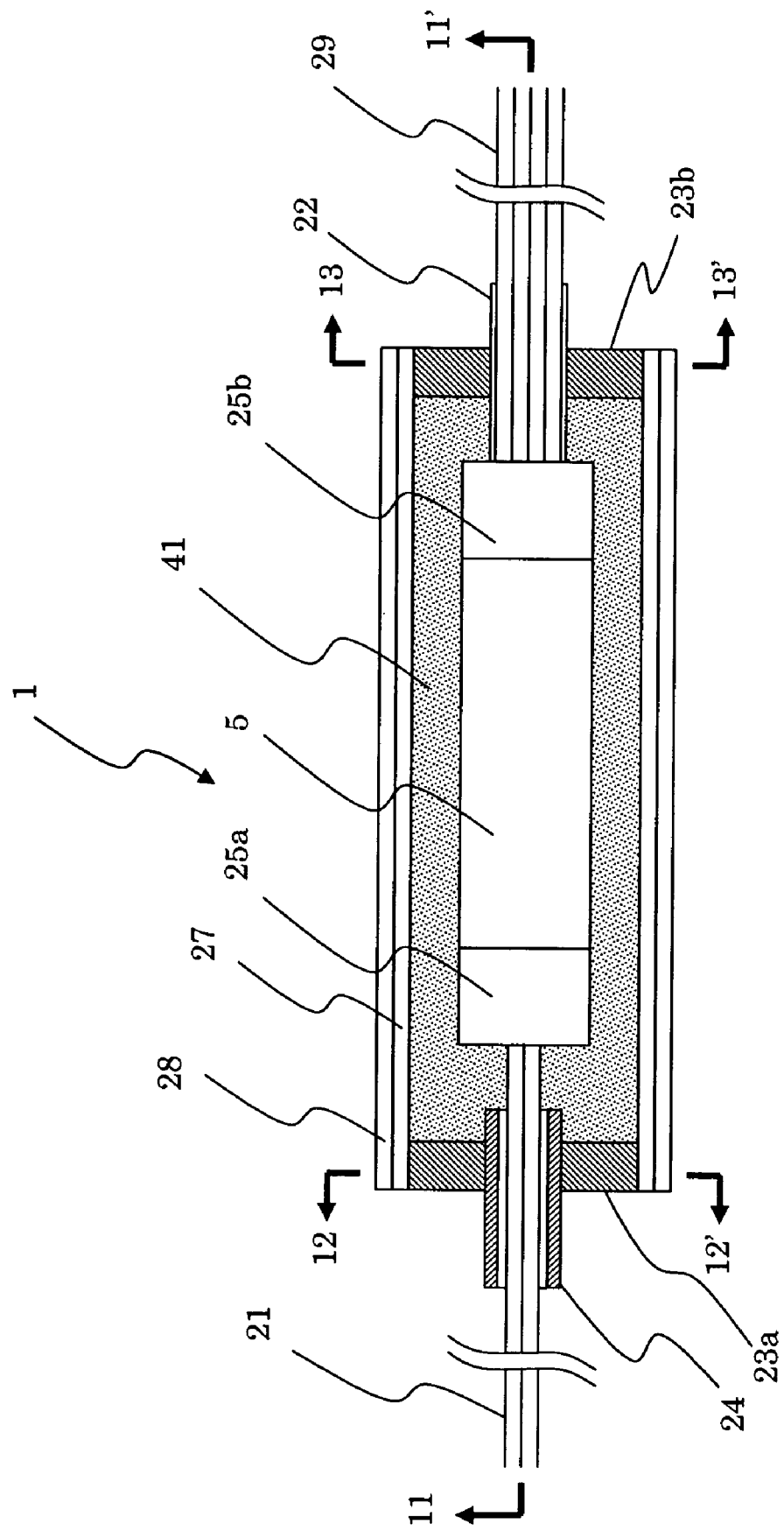
FIG. 10 is a cross-sectional view of the second embodiment of an optical element module of the present invention from the front view.
Figure 11:
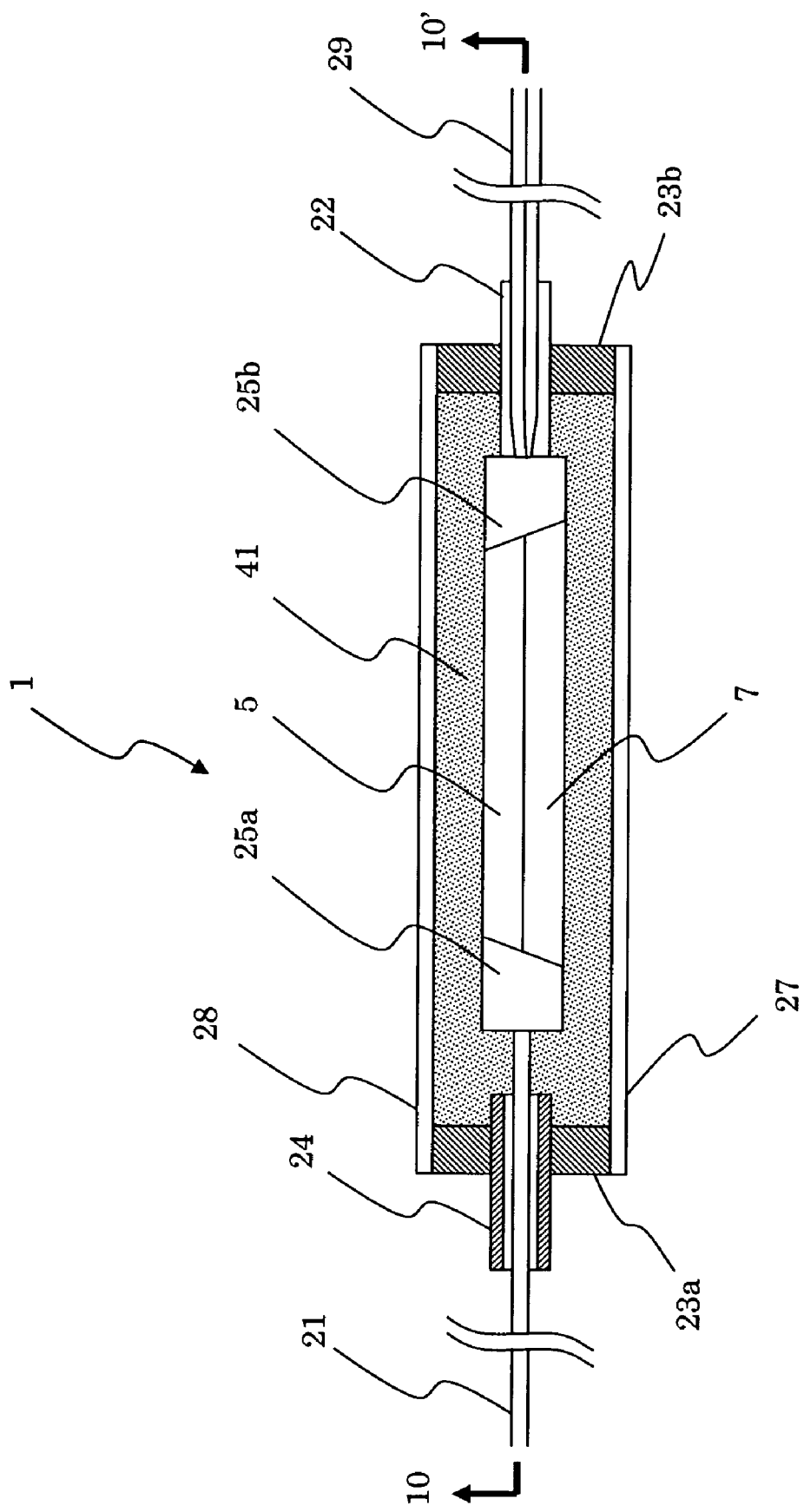
FIG. 11 is a cross-sectional view of the second embodiment of an optical element module of the present invention from the side view.
Figure 12:
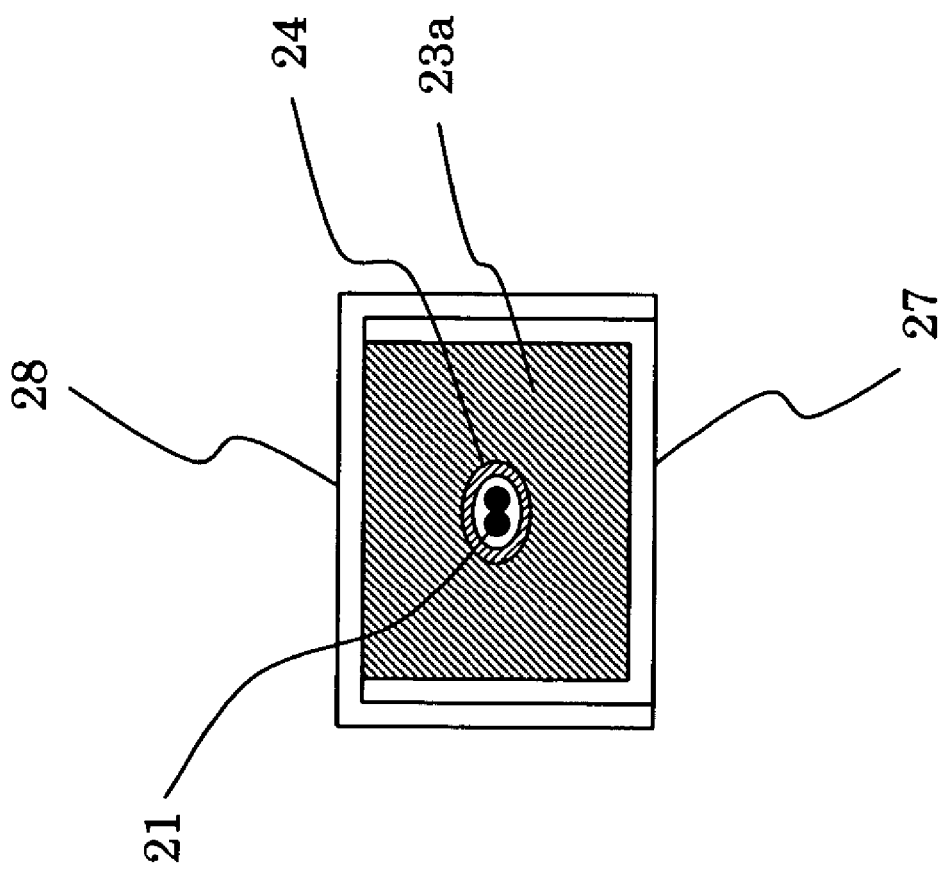
FIG. 12 is a cross-sectional view of the light input portion of the second embodiment of an optical element module of the present invention.
Figure 13:
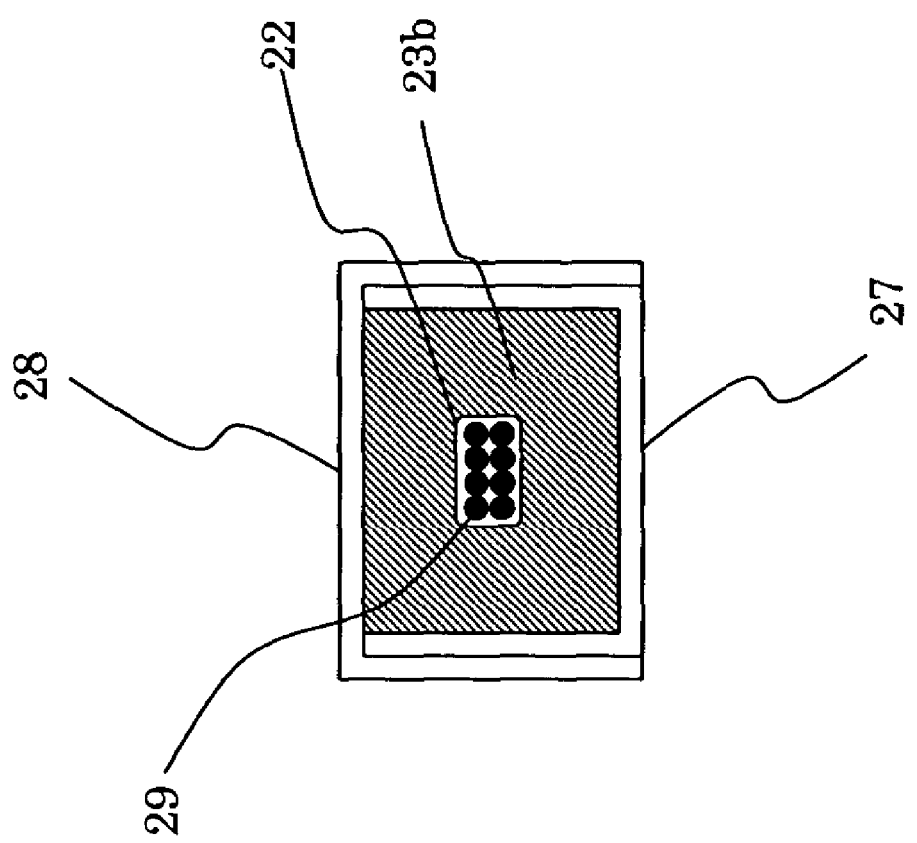
FIG. 13 is a cross-sectional view of the light output portion of the second embodiment of an optical element module of the present invention.

A second embodiment of the present invention is shown in FIG. 10, FIG. 11, FIG. 12 and FIG. 13. FIG. 10 is a plan cross-sectional view of an optical element module, FIG. 11 is a cross-sectional view taken along the lines 11–11' in FIG. 10, FIG. 12 is a cross-sectional view taken along the lines 12–12' in FIG. 10, and FIG. 13 is a cross-sectional view taken along the lines 13–13' in FIG. 10. Further, FIG. 10 is a cross-sectional view taken along the lines 10–10' in FIG. 11. In FIGS. 10–13, 1 represents an optical element module, 15 represents an optical waveguide protecting plate, 17 represents an optical waveguide chip as an optical element, 21 represents primary coated optical fibers, 22 represents taped optical fibers, 23a and 23b represent rubber boots, 24 represents a pipe, 25a and 25b represent optical fiber holding portions, 27 represents a lower portion casing, 28 represents an upper portion casing, and 29 represents primary coated optical fibers.

The difference with the first embodiment is that the optical waveguide chip has two light inputs and eight light outputs. The two light inputs can be used for various purposes. For example, the two light inputs can be used in a redundant configuration where one is actively used and the other is for backup, or in a configuration where one is used for signals and the other is used for testing at different wavelengths.

In the present embodiment, two primary coated optical fibers are used for light input. The two primary coated optical fibers are inserted through the inside of the pipe 24 provided in the rubber boot 23a in the same way as in the first embodiment. The internal diameter of the pipe 24 is made larger than the outside diameter of the primary coated optical fibers 21. For example, when the outside diameter of the primary coated optical fibers is 250 µm, a pipe having an elliptical cross section with a minor axis of 0.5 mm and a major axis of 1 mm is preferred. In view of the fact that the primary coated optical fibers inserted through the pipe 24 are bent by handling and the like, the length of the pipe 24 is made longer than the length of the through hole of the rubber boot 23a. For example, the pipe 24 preferably protrudes about 1 mm into the inside of the optical element module from the rubber boot 23a, and protrudes about 5 mm to the outside of the optical element module.

Further, for light output, there are two bundles of four taped optical fibers which form eight light outputs. Namely, at one end, two bundles of four taped optical fibers are stacked in two stages, and at the connection side with the optical waveguide chip, the two bundles of four taped optical fibers are alternately assembled in a primary coated state, and array converted optical fibers arranged in a row inside a V-groove are employed. In the array converted optical fibers, the array pitch of the optical fibers at the connection portion with the optical waveguide chip is narrowed to 125 µm which is equal to the outside diameter of a bare optical fiber. Accordingly, the waveguide space of the optical waveguide corresponding to this is also narrowed, whereby the optical waveguide chip can be miniaturized, and this makes it possible to miniaturize the optical element module. Instead of making array converted optical fibers, it is also possible to remove the secondary coating of the eight taped optical fibers to form primary coated optical fibers which are then connected to the optical waveguide chip.

A temperature cycle test was carried out for the optical element module obtained in this way. The test results are the same as those shown in FIG. 9. Eight hours formed one cycle, and from the results obtained by carrying out a temperature cycle from −40° C. to +75° C., it is clear that the optical loss in the optical element module of the present embodiment does not experience the large fluctuations that occur in related art optical element modules even when the environmental temperature of the optical element module changes.

In the present embodiment, primary coated optical fibers are used for the optical fibers for light input, but in the case where primary coated optical fibers are used for the optical fibers for light output, such primary coated optical fibers may be inserted through a pipe provided in a rubber boot. Further, an optical waveguide chip is used as an example of an optical element provided inside a casing, but the same results can be obtained for a semiconductor light-generating optical element or a light-receiving optical element.

Embodiment 3

The third embodiment is obtained by filling a gel into the internal cavity of the optical element module described in the first embodiment or the second embodiment. For example, in FIGS. 10 and 11, a gel material 41 is filled into the internal cavity of the optical element module 1. By filling such cavity with a gel material, it is possible to improve the bearing force against mechanical stresses such as vibration, shocks and the like applied to the optical element module. Here, a silicone grease is preferable as this gel material.

On the other hand, even though the surface tension of the gel material normally prevents the gel material from leaking out from the space between the primary coated optical fibers 21 and the pipe 24, in the case where the expansion/contraction of the casing and the expansion/contraction of the gel material do not match when the environmental temperature changes, for example, when the gel material undergoes a larger expansion than the expansion of the casing, or when the gel material undergoes a smaller contraction than the contraction of the casing, the gel material of the casing will leak out from the space between the primary coated optical fibers 21 and the pipe 24.

In this regard, the difference between the volume of the internal cavity of the optical element module and the volume of the gel material that occurs accompanying environmental temperature fluctuations is preferably set to be smaller than the volume of the space between the pipe 24 and the primary coated optical fibers 21. When such setting is made, even when the volume of the gel material undergoes expansion and contraction accompanying environmental temperature fluctuations, the gel material only advances into and retreats out of the space between the pipe 24 and the primary coated optical fibers 21, and even when the environmental temperature fluctuates, the gel material does not leak out.

The internal cavity of the optical element module described in the first embodiment may be filled with a gel material. In this case, the difference between the volume of the internal cavity of the optical element module and the volume of the gel material that occurs accompanying environmental temperature fluctuations is preferably set to be smaller than the volume of the space between the pipe and the primary coated optical fiber.

As described above, even in the case where primary coated optical fibers are used for light input and light output in an optical element module, the present invention makes it possible to prevent micro bends accompanying environmental temperature fluctuations, and this makes it possible to provide an optical element module having stable temperature characteristics.

What is claimed is:

1. An optical element module, comprising:
    a casing;
    an optical element provided inside said casing;
    a first rubber boot which is adhesively fixed to the input side end of said casing;
    a pipe which is fixed to said first rubber boot and communicates the inside of said casing to the outside;
    a primary coated optical fiber which is inserted through said pipe in a loose structure and connected to said optical element;
    a second rubber boot which is adhesively fixed to the output side of said casing and
    taped optical fibers which are adhesively fixed to said second rubber boot and connected to said optical element.

2. The optical element module according to claim 1, wherein an internal cavity of said optical element module is filled with a gel material.

3. The optical element module described in claim 2, wherein the difference between the volume of said internal cavity of said optical element module and the volume of said gel material that occurs accompanying environmental temperature fluctuations is smaller than the volume of the space between said pipe and said primary coated optical fiber.

* * * * *

UNITED STATES PATENT AND TRADEMARK OFFICE
CERTIFICATE OF CORRECTION

| | |
|---|---|
| PATENT NO. | : 7,086,789 B2 |
| APPLICATION NO. | : 10/648175 |
| DATED | : August 8, 2006 |
| INVENTOR(S) | : Nobuo Tomita et al. |

It is certified that error appears in the above-identified patent and that said Letters Patent is hereby corrected as shown below:

On the Title Page; Item (73)
Please add Assignee
--Nippon Telegraph and Telephone Corporation, Tokyo, Japan--

Signed and Sealed this

Fourth Day of September, 2007

JON W. DUDAS
*Director of the United States Patent and Trademark Office*